Jan. 3, 1950     Q. P. MASSARE     2,493,258
CAMPING TRAILER
Filed April 26, 1947     2 Sheets-Sheet 1
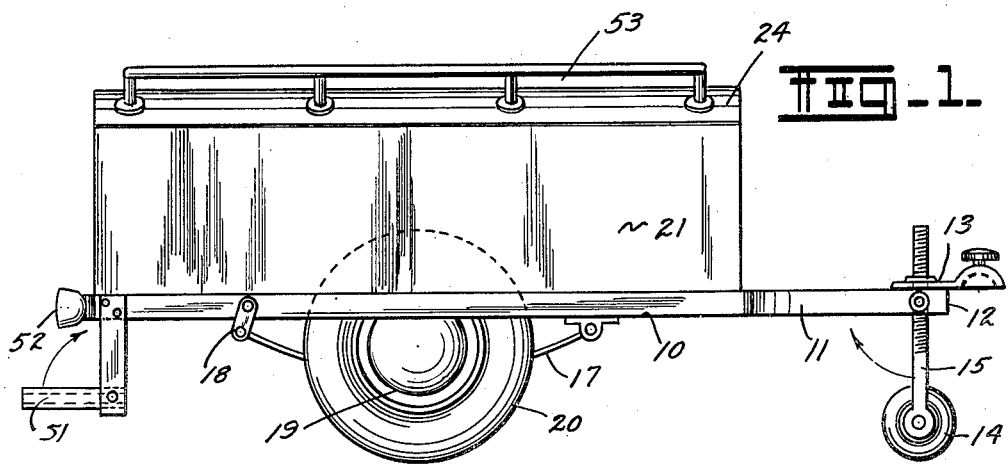
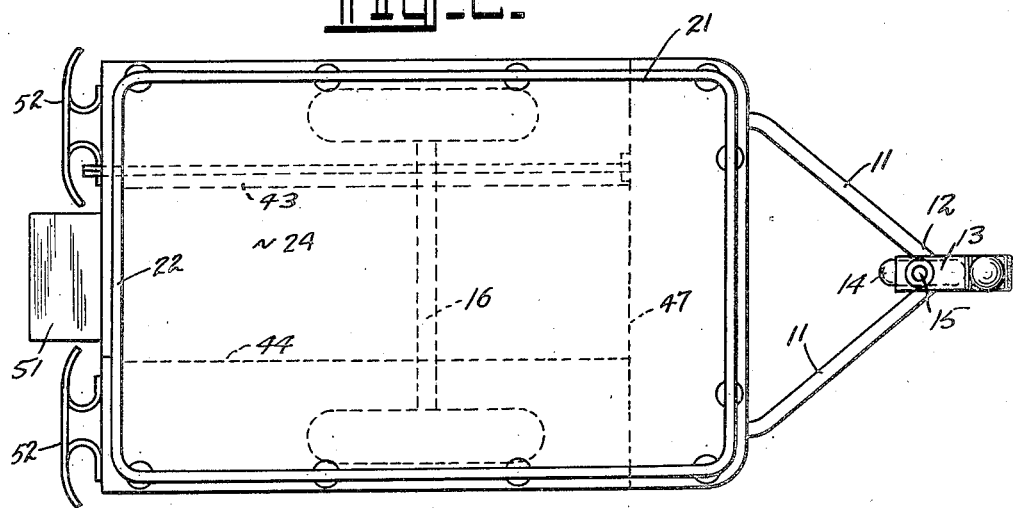
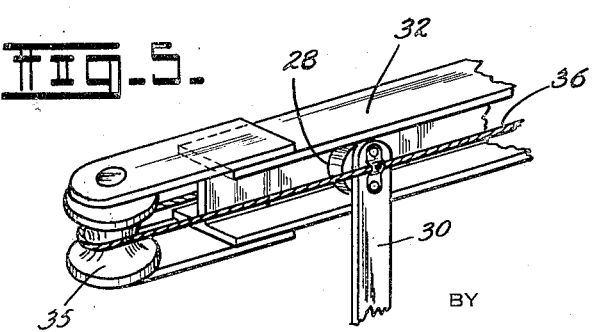
INVENTOR.
Quido P. Massare.
W. B. Harpman
ATTORNEY.

Jan. 3, 1950 Q. P. MASSARE 2,493,258
CAMPING TRAILER
Filed April 26, 1947 2 Sheets-Sheet 2
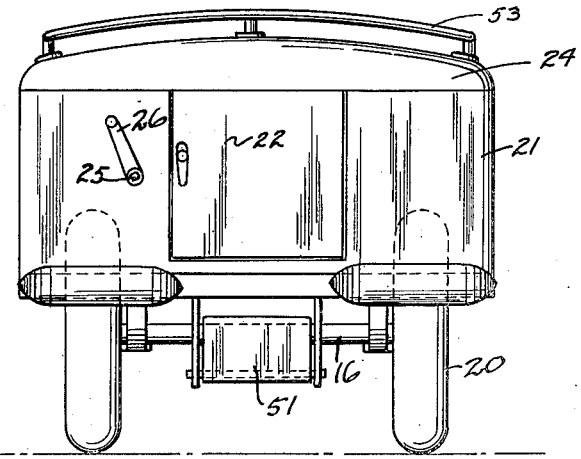
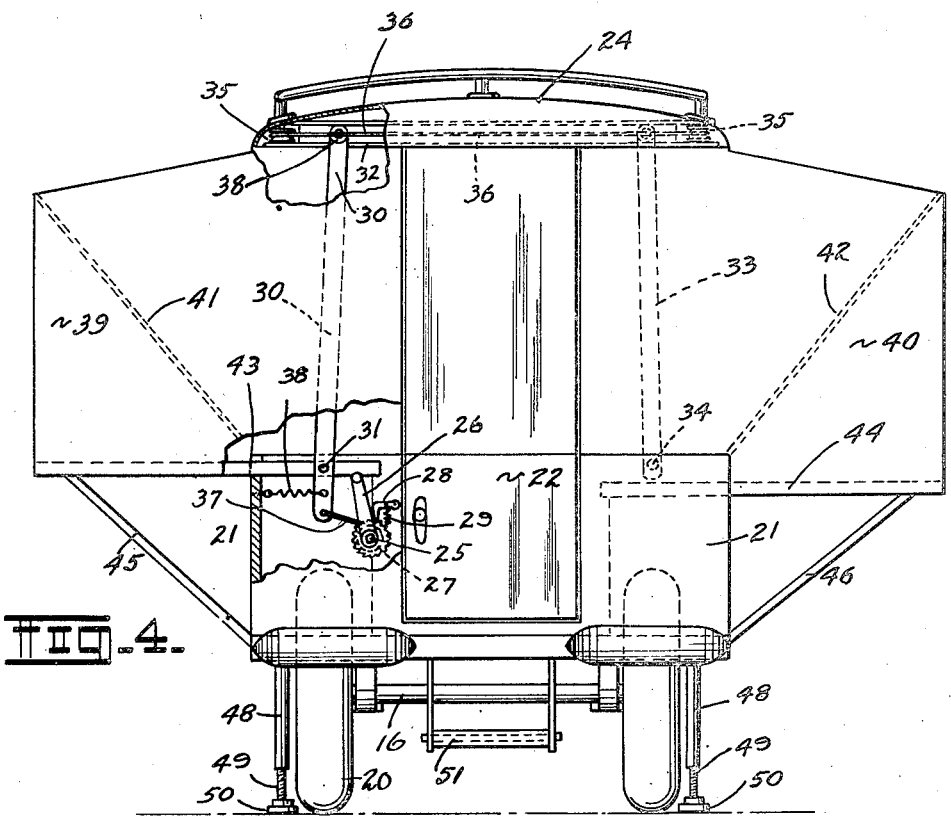
INVENTOR.
Quido P. Massare.
BY W. B. Harpman
ATTORNEY.

Patented Jan. 3, 1950

2,493,258

UNITED STATES PATENT OFFICE 2,493,258

CAMPING TRAILER

Quido P. Massare, Windham, Ohio

Application April 26, 1947, Serial No. 744,051

4 Claims. (Cl. 296—23)

This invention relates to a trailer and more particularly to a camping trailer, portions of which are collapsible for portability.

The principal object of the invention is the provision of a camping trailer of a collapsible type capable of being expanded into usable state.

A further object of the invention is the provision of a camping trailer, the roof portion of which acts as an enclosure for the collapsible portions of the trailer.

A still further object of the invention is the provision of a camping trailer having means for automatically raising the roof portion thereof to facilitate the expansion of the trailer.

A still further object of the invention is the provision of a camping trailer of a compact attractive design capable of being produced economically and hence widely distributed.

A still further object of the invention is the provision of a camping trailer of the collapsible type which may be expanded to provide two full sized beds and one single sized bed.

The camping trailer shown and described herein has been designed to form a convenient and practical camping accessory which may be towed by an automobile, truck or the like and which is capable of being expanded or opened for use to provide a relatively large conveniently arranged interior particularly adapted for providing sleeping quarters. The construction includes novel arrangement of mounting and supporting a deck or roof portion which may be operated as in opening or expanding the trailer by the simple expedient of turning a crank.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a side elevation of the camping trailer in closed position.

Figure 2 is a top plan view of the camping trailer in closed position.

Figure 3 is a rear view of the camping trailer in closed position.

Figure 4 is a rear view of the camping trailer in open or expanded position.

Figure 5 is an enlarged detail view of a portion of the means for raising the roof or deck portion of the trailer.

By referring to the drawings and Figures 1 and 2 in particular, it will be seen that a camping trailer has been disclosed which includes a pair of channel type frame members 10 which are spaced with respect to one another and positioned in parallel relationship, the foremost ends of the frame members 10 being formed at angles 11 so that they converge and touch at their extreme outer ends 12. A trailer hitch 13 is affixed to the outer ends 12 of the frame members 10 and a retractable wheel 14 positioned on a bifurcated shaft 15 is pivotally affixed to the frame 10 near the ends 12 thereof, so that it can be swung upwardly into retracted position as shown by the arrow in Figure 1 of the drawings. An axle 16, preferably of a tubular type, is disposed beneath the frame members 10 and connected thereto by means of a pair of semi-elliptical springs 17, the connections including shackles 18 at the rearmost ends of the springs 17. Ground engaging wheels 19 are positioned on the axle 16 and tires 20 are mounted on the wheels 19.

The camping trailer includes a rectangular boxlike body 21 positioned on the spaced frame members 10 and includes a pair of side sections, a front section and a rear section having a door 22 positioned therein, see Figure 3 of the drawings, and hinged thereto to provide access into the interior of the body 21. The camping trailer has a floor 23 positioned on the frame members 10 and a deck or roof member 24 positioned on the upper portion of the body member and mounted by means enabling it to be elevated with respect to the body 21 so that the camping trailer can be expanded into a space of partitioned area to provide suitable sleeping quarters and the like within the camping trailer. Means for raising the roof or deck portion 24 of the trailer is disclosed in Figures 4 and 5 of the drawings and by referring now to Figure 4 of the drawings, it will be seen that a shaft 25 is positioned longitudinally of the trailer body 21 and journaled at its ends therein and having a squared end portion extending outwardly through the back wall of the trailer body 21, so that a crank 26 may be positioned thereon. A ratchet wheel 27 is positioned on the shaft 25 and a latch 28 is pivoted in operative relation to the ratchet wheel 27 and normally held thereagainst by means of a spring 29. A pair of arms 30 are pivoted at 31 to the body 21 of the trailer on one side thereof, the left hand side as shown in Figure 4 of the drawings, and in collapsed position of the trailer the arms 30 lie horizontally crosswise of the trailer body. The uppermost ends of the arms 30, one of which is positioned at the back of the trailer and the other at the front of the trailer, are engaged in one side of double channels 32, see Figure 5, which double channels 32 are positioned within the roof 24, one channel 32 being located adjacent the front of the roof and positioned transversely thereof and one channel 32 being located adjacent the back portion of the roof and located transversely thereof. The trailer is also provided with a secondary pair of arms 33 which are pivoted by pivots 34 to the trailer body 21 and which arms 33 are engaged at their uppermost ends at the front and back of the trailer, respectively in the double channels 32 and on the opposite sides thereof from the arms 30 heretofore referred to.

Still referring to Figures 4 and 5 of the drawings, it will be seen that a pair of pulleys 35 are positioned one adjacent the ends of each of the double channels 32 at both the front and the back of the roof 24 and that a cable 36 is trained over each of the pairs of the pulleys 35 so as to form a continuous belt-like flexible connection which is attached to the oppositely disposed arms 30 and 33. Thus, the arms 30 and 33 at the back of the trailer, for example, each engage the opposite sides of the double channels 32 in the roof 24 of the trailer and each of these arms 30 and 33 at the back of the trailer are interconnected by means of the cable 36 so that when one of the arms is moved transversely along the channel 32 the other of the arms is moved in the opposite direction. It is thus possible to transmit motion from the arm 30, for example, to the arm 33 so that when means operated by the crank 26 and the shaft 25 is used to swing the arm 30 upright from a horizontal position it will impart movement by way of the cable 36 to the free end of the arm 33 and thereby cause it to rise simultaneously with the arm 30. The movement is conveyed to the front of the trailer through the shaft 25 which runs longitudinally thereof where a similar oppositely disposed pair of arms 30 and 33 are positioned and thus the pair of arms 30 on the right hand side of the trailer, as shown in Figure 4, are directly actuated by the shaft 25 and the crank 26 by way of a reel-like action imparted to a flexible cable 37 which is attached to the shaft 25 and wound thereabout and the ends of which are attached to the depending ends of the arms 30 so that when the shaft 25 is revolved the flexible cable 37 moves the arms 30 toward the shaft 25. It will be observed that a spring 38 is positioned to bias the ends of the arms 30 towards the shaft 25 and thereby offset a considerable portion of the weight of the roof 24 of the trailer in this operation. It will thus be seen that when the arms 30 are moved from horizontal position to vertical position, their uppermost ends which are provided with rollers 38 which run in the channels 32 will move transversely of the roof 24 in the channels 32 and at the same time move the opposite pair of arms 33 on the right side of the trailer as shown in Figure 4, in an opposite motion due to the interconnection of the cable 36 traveling over the pairs of pulleys 35. As this motion occurs, the free ends of the arms 30 and 33 move toward each other in the opposite sides of the channels 32 in the roof 24 and cross their respective paths and move into vertical position as shown in the end elevation in Figure 4 of the drawings, where they stand vertically and hold the roof 24 in maximum elevated relation to the body 21 of the trailer. It will be observed that the ratchet wheel 27 is held in position by the latch 28 thereby insuring the vertical positioning of the arms 30 and hence the arms 33 and the roof 24 supported thereby.

When this has been accomplished, the canvas sides and ends of the trailer which are indicated by the numerals 39 and 40 are pushed out into their appropriate positions and maintained as shown in Figure 4 of the drawings, by means of two pairs of rods 41 and 42, respectively. The bottoms of the canvas side and end portions 39 and 40 are attached to slidably positioned beds 43 and 44, respectively which are arranged on different levels, so that they may be overlapped in collapsed position when they are both in the center portion of the trailer and thereby contained within the limits of the body 21. The bed 43 is pushed outwardly to its normal position, as shown in Figure 4 of the drawings, and a pair of support members 45 are positioned therebeneath on an angle and in engagement with the trailer body 21. The bed 44 is also pushed out into normal position as shown in Figure 4 of the drawings, and a pair of support members 46 are engaged therewith and also with the trailer body 21.

It will thus be seen that the camping trailer has been expanded into a room sized area enclosing a pair of double beds 43 and 44 and by referring to Figure 2 of the drawings, it will be observed that a dotted line transversely thereof and indicated by the numeral 47, indicates the forward end of the double bed and it will be seen that there is sufficient area across the front of the trailer to form a single bed, thus making it possible to provide sleeping quarters for five people within the trailer.

The trailer body 21 is provided with a pair of retractable legs 48 which have adjustable lower portions 49 telescopically engaged therein which in turn are provided at their lowermost ends with pads 50 so that the trailer can be supported thereon and leveled when positioned on an uneven surface. The wheel 14 supporting the front of the trailer is also adjustably positioned, thus providing a complete leveling and supporting action for the trailer in fixed position on a supporting surface. A convenient foldable step 51 is provided so that access may be conveniently had to the door 22 in the trailer and thereby into the interior thereof. The wheels 19 are positioned in wells in the trailer body 21 and the wells normally underlie the beds 43 and 44 and the space in front of and in back of the wells is preferably occupied by a suitable cabinet in which various camping equipment may be conveniently carried.

The trailer is preferably provided with bumpers 52 on the rear portion and it will be observed that in closed position as shown in Figures 1, 2 and 3 of the drawings, the roof portion 24 of the trailer is provided with a guard rail 53 to make it possible to carry various objects on the roof 24, thereby enabling the trailer to be used for hauling as well as for enclosing and carrying camping equipment.

It will thus be seen that a novel camping trailer has been disclosed which incorporates a novel means of positioning the roof portion of the trailer when the trailer is opened up or expanded as for use and further that when the trailer is collapsed the canvas portions of the trailer are completely enclosed in the solid metal body portions which are preferably formed of aluminum or other light weight material, thereby providing for a durable and long lasting structure. The several body parts are of simple construction and may be economically formed and the roof supporting and raising and lowering means comprising the pairs of arms 30 and 33 and their interconnecting and operating devices are of simple construction and relatively free of mechanical trouble in operation.

It will thus be seen that the several objects of the invention are met by the camping trailer disclosed herein.

Having thus described my invention, what I claim is:

1. In a camping trailer including a body having supporting wheels thereinunder and a movably positioned roof portion thereover, the said roof portion resting on said body and forming a closure therefor when the camping trailer is collapsed, means for elevating the said roof portion, said means comprising two pairs of arms pivotally affixed to the said body in oppositely disposed relation and having their free ends slidably engaging the said roof portion, pulleys positioned in said roof portion in oppositely disposed pairs and endless cables movably positioned over said pulleys and transversely in said roof portion and interconnecting the free ends of said arms so that motion imparted to one of the pairs of arms is imparted to the said cables and thereby to the other of the said pairs of arms to move the same in unison, and means in the trailer body for imparting movement to the said arms to move them from horizontal to vertical position to elevate the roof portion.

2. In a camping trailer including a body having supporting wheels thereinunder and a movably positioned roof portion thereover, the said roof portion resting on said body and forming a closure therefor when the camping trailer is collapsed, means for elevating the said roof portion, said means comprising two pairs of arms pivotally affixed to the said body and having their opposite ends slidably engaging the said roof portion, means for moving the said arms into vertical position so as to elevate the said roof, the said means including a shaft positioned longitudinally of the said trailer body, flexible connectors wound on the said shaft and attached to the said pairs of arms, and means for turning the said shaft, two pairs of oppositely disposed pulleys positioned in the said roof and a pair of cables each of which is trained over a pair of the pulleys, the said cables affixed to the upper ends of the said oppositely disposed pairs of arms so that motion imparted to one of the pairs of arms by the flexible connectors and shaft is imparted thereby to the other pair of arms to move the same in the opposite direction.

3. In a camping trailer including a body portion and a removable roof portion, means for moving the roof portion vertically with respect to the said body portion, oppositely disposed channels positioned transversely of the said roof portion and pulleys positioned in the said roof portion adjacent the ends of the said channels and flexible cables trained over the said pulleys, arms pivoted to the trailer body and engaging the said channels and the said flexible cables, and means on the trailer body for imparting movement to the said arms so as to move them from horizontal crossed position to vertical spaced position for elevating the said roof portion.

4. In a camping trailer including a body and a movable roof portion, means for moving the said roof portion, said means including a plurality of arms pivoted in spaced relation to one another to the said body portion and lying horizontally in the said body portion when the roof portion is in registry therewith, oppositely disposed pulleys in the said roof portion and flexible cables trained thereover interconnecting the outermost ends of the said arms so that movement imparted to some of the said arms is imparted simultaneously to the other of the said arms by the cables, a shaft in said trailer, secondary cables wound on said shaft and attached to some of said arms near their points of pivotal attachment to said body, and means for rotating the said shaft to wind the said secondary cables thereon and thereby move the said arms from horizontal to vertical position.

QUIDO P. MASSARE.

REFERENCES CITED

The following references are of record in the file of this patent:

UNITED STATES PATENTS

| Number | Name | Date |
| --- | --- | --- |
| 765,432 | Lehr | July 19, 1904 |
| 770,775 | Norris | Sept. 27, 1904 |
| 1,946,164 | Houdashelt | Feb. 6, 1934 |
| 2,076,486 | Watt | Apr. 6, 1937 |
| 2,155,582 | Bond | Apr. 25, 1939 |
| 2,182,967 | Kors | Dec. 12, 1939 |
| 2,298,619 | Gorton | Oct. 13, 1942 |